(12) United States Patent
Huemiller et al.

(10) Patent No.: US 11,688,843 B2
(45) Date of Patent: Jun. 27, 2023

(54) CALENDERED ELECTRODE AND METHOD OF MAKING SAME

(71) Applicant: GM Global Technology Operations LLC, Detroit, MI (US)

(72) Inventors: Erik D. Huemiller, Waterford, MI (US); Nicholas P. Irish, Keego Harbor, MI (US); Ryan C. Sekol, Grosse Point Woods, MI (US); Dmitriy Bruder, Auburn Hills, MI (US); Shaomao Xu, Sterling Heights, MI (US); Jin Liu, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/007,102

(22) Filed: Aug. 31, 2020

(65) Prior Publication Data

US 2022/0069273 A1   Mar. 3, 2022

(51) Int. Cl.
*H01M 4/04* (2006.01)
*H01M 4/66* (2006.01)
*H01M 10/058* (2010.01)
*H01M 4/02* (2006.01)

(52) U.S. Cl.
CPC ....... *H01M 4/0435* (2013.01); *H01M 4/0471* (2013.01); *H01M 4/66* (2013.01); *H01M 10/058* (2013.01); *H01M 2004/021* (2013.01)

(58) Field of Classification Search
CPC ............ H01M 4/04; H01M 4/66; H01M 4/14; H01M 10/0525; H01M 10/058
See application file for complete search history.

(56) References Cited

U.S. PATENT DOCUMENTS

| | | | |
|---|---|---|---|
| 9,583,755 B2 | 2/2017 | Uchida et al. | |
| 10,468,663 B2 | 11/2019 | Shin et al. | |
| 10,686,193 B2 | 6/2020 | Oh et al. | |
| 2013/0017340 A1* | 1/2013 | Brown ................ | H01M 4/0404 427/458 |
| 2018/0233751 A1* | 8/2018 | Pras .................... | H01M 50/403 |
| 2019/0267608 A1* | 8/2019 | Choi ....................... | H01M 4/04 |

* cited by examiner

*Primary Examiner* — Kenneth J Douyette
(74) *Attorney, Agent, or Firm* — Vivacqua Crane, PLLC

(57) ABSTRACT

A method of making a calendered electrode for a battery cell comprises introducing a coated electrode having a first surface extending thereover. The coated electrode has a predetermined density of active materials for ion transport. The method further comprises selectively modifying the coated electrode by patterning the first surface to define a patterned electrode having a first portion and a second portion. After the step of selectively modifying, the method further comprises compressing the patterned electrode by calendering the first surface to provide the first portion having a first density of active materials and the second portion having a second density of active materials. The second density is greater than the first density to define the calendered electrode having a spatial variation of active material density.

11 Claims, 4 Drawing Sheets

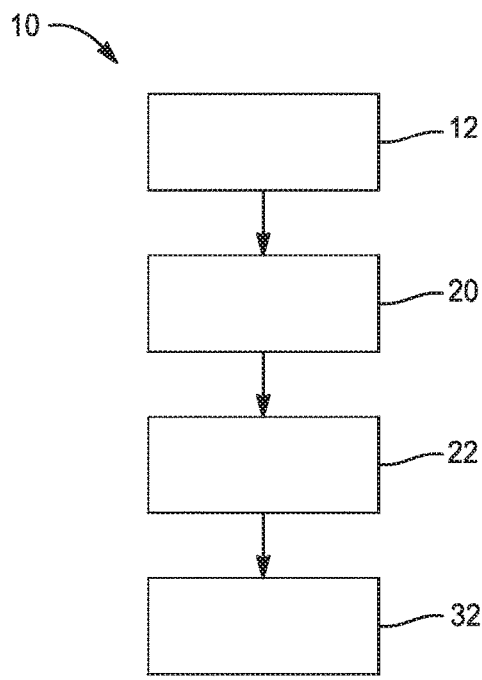
FIG. 1
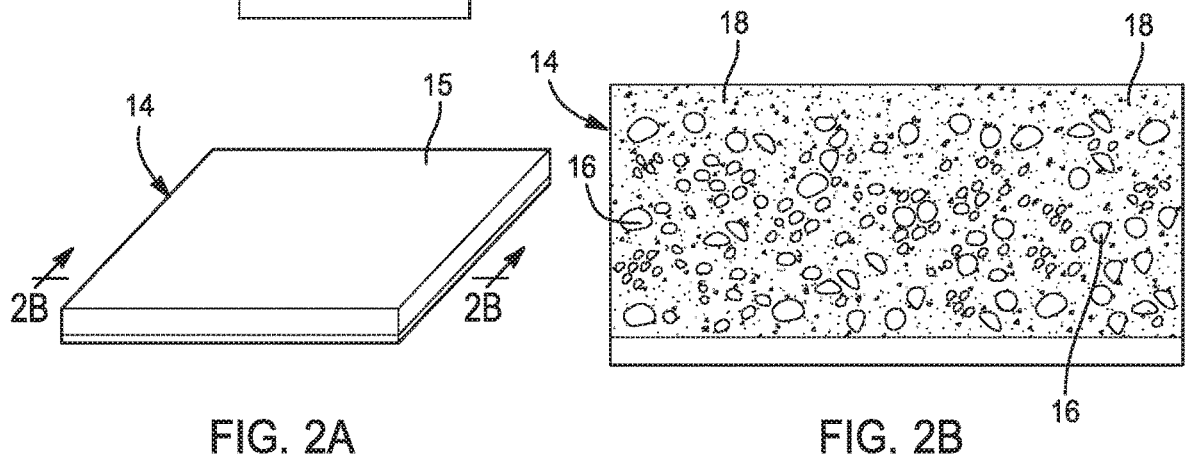
FIG. 2A
FIG. 2B
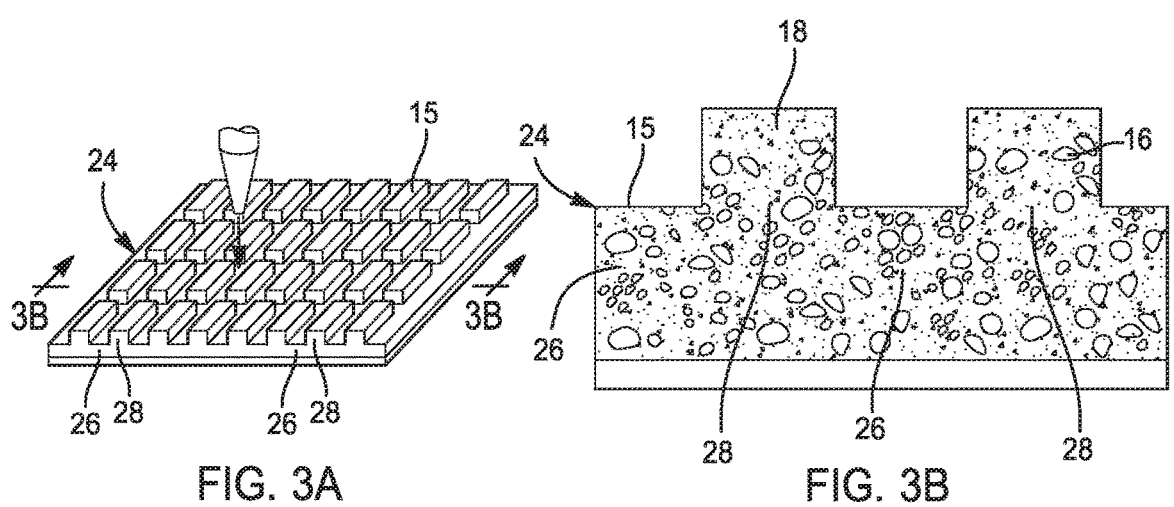
FIG. 3A
FIG. 3B

CALENDERED ELECTRODE AND METHOD OF MAKING SAME

INTRODUCTION

The present disclosure relates to battery cells and, more particularly, current collectors of battery cells for vehicles.

For vehicular battery cells, a thicker current collector or electrode causes a reduction in the usefulness of active materials due to a lack of spatial variation in the density and porosity of the electrode. Current methods of reducing tortuosity within an electrode are acceptable. However, improvements can be made.

SUMMARY

Thus, while current calendering processes achieve their intended purpose, there is a need for a new and improved system and method for making a calendered electrode for a battery cell.

According to one aspect of the present disclosure, a method of making a calendered electrode for a battery cell is provided. In this embodiment, the method comprises introducing a coated electrode having a first surface extending thereover. The coated electrode has a predetermined density of active materials for ion transport. In this embodiment, the method further comprises selectively modifying the coated electrode by patterning the first surface to define a patterned electrode having a first portion and a second portion. After the step of selectively modifying, the method further comprises compressing the patterned electrode by calendering the first surface to provide the first portion having a first density of active materials and the second portion having a second density of active materials. The second density is greater than the first density to define the calendered electrode having a spatial variation of active material density.

In another embodiment of this aspect, the step of selectively modifying comprises selectively removing a volume of the active materials from the patterned electrode by subtractive patterning the first surface to induce in-plane spatial variations in the density of the calendered electrode during the step of compressing. In this embodiment, subtractive patterning includes one of laser patterning and dot patterning.

In yet another embodiment, the method further comprises, before the step of selectively modifying, drying the coated electrode at a temperature of between about 70 degrees Celsius (C) and about 150 C for between about 0 minutes and about 60 minutes.

In still another embodiment, the method further comprises partially drying the coated electrode before the step of selectively modifying. The step of partially drying comprises heating the coated electrode to between about 70 C and 150 C for between about 0 minutes and about 30 minutes. Moreover, the method further comprises finalize drying the patterned electrode after the step of selectively modifying. The step of finalize drying comprises heating the patterned electrode to between about 70 C and 150 C for between about 20 minutes and about 40 minutes. In one example, after partially drying, the step of selectively modifying the coated electrode comprises stamping the first surface to arrange the topography of the coated electrode allowing for in-plane spatial variations in the density of the calendered electrode during the step of compressing.

In another embodiment, the first density is the predetermined density.

In yet another embodiment, the first density is between about 40% and about 60% active material, and the second density is between about 60% and about 90% active material.

In still another embodiment, the step of compressing comprises calendering the first surface at a predetermined line speed, a predetermined pressure, a predetermined gap, and a predetermined temperature. In one example, the predetermined line speed is between about 0.1 and about 150 meters per minute, the predetermined pressure is between about 1 and about 10 megapascals, the predetermined gap is between about 0.015 millimeter (mm) and 0.2 mm, and the predetermined temperature is between about ambient temperature and about 80 C.

In another embodiment, the first portion includes a plurality of first portions and wherein the second portion includes a plurality of second portions.

In another aspect of the present disclosure, a method of making a calendered electrode for a battery cell is provided. In one embodiment, the method comprises introducing a coated electrode having a first surface extending thereover. The coated electrode has a predetermined porosity of active materials for ion transport. In this embodiment, the method further comprises drying the coated electrode. The method further comprises selectively modifying the first surface by patterning the coated electrode to define a patterned electrode having a first portion and a second portion. Moreover, the method further comprises, after the step of selectively modifying, compressing the patterned electrode by calendering to provide the first portion having a first porosity of active materials and the second portion having a second porosity of active materials. In this embodiment, the second porosity is less than the first porosity to define the calendered electrode having a spatial variation of porosity.

In one embodiment, the step of selectively modifying comprises selectively removing a volume of the active materials from the first surface by subtractive patterning to induce in-plane spatial variations in the porosity of the calendered electrode during the step of compressing.

In another embodiment, the step of drying includes heating the coated electrode to between about 70 C and about 150 C for between about 0 minutes and about 60 minutes.

In yet another embodiment, the step of drying comprises partially drying the coated electrode and, after the step of selectively modifying, further comprises finalize drying the patterned electrode. In this embodiment, the step of selectively modifying the first surface comprises stamping the first surface to arrange the topography of the coated electrode allowing for in-plane spatial variations in the porosity of the calendered electrode during the step of compressing.

In one embodiment, the first porosity is the predetermined porosity and is between about 40% and about 60% porous, and wherein the second porosity is between about 10% and 40% porous.

In yet another aspect of the present disclosure, a current collector for a battery cell is provided. In one embodiment, the current collector comprises a calendered electrode comprising a selectively modified first portion having a first density of active materials and a selectively modified second portion having a second density of active materials. In this embodiment, the second density is greater than the first density for spatial variation of active material density to enhance ion transport within the calendered electrode.

In another embodiment, the first portion includes a plurality of first portions and the second portion includes a plurality of second portions for enhanced ion transport within the calendered electrode.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a flowchart of a method of making a calendered electrode for a battery cell in accordance with one embodiment of the present disclosure.

FIG. 2a is a perspective view of a coated electrode of the method in FIG. 1.

FIG. 2b is a cross-sectional view of the coated electrode in FIG. 2a.

FIG. 3a is a perspective view of a patterned electrode of the method in FIG. 1 and in accordance with another embodiment of the present disclosure.

FIG. 3a is a cross-sectional view of the patterned electrode in FIG. 3a.

FIG. 3b is a cross-sectional view of the patterned electrode in FIG. 3a.

FIG. 4b is a cross-sectional view of the calendered electrode of the method in FIG. 4a.

FIG. 8b is a cross-sectional view of a patterned electrode by the stamping tool in FIG. 7a.

FIG. 8c is a cross-sectional view of a calendered electrode from the patterned electrode in FIG. 8a.

DETAILED DESCRIPTION

Figure 4A:
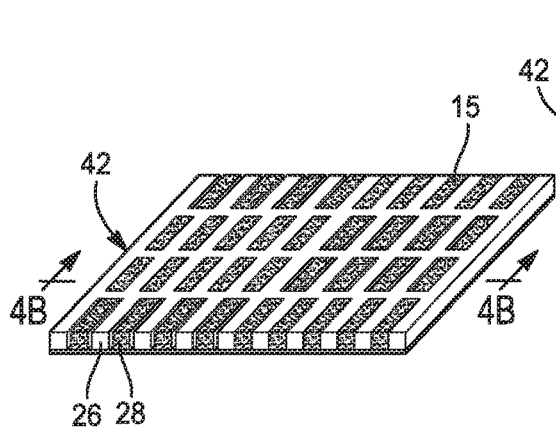
FIG. 4a is a perspective view of a calendered electrode of the method in FIG. 1.

The following description is merely exemplary in nature and is not intended to limit the present disclosure, application, or uses.

According to aspects of the present disclosure, a method 10 of making a calendered electrode for a battery cell is provided. As shown in FIGS. 1-2b, the method 10 comprises a step of introducing a coated electrode 14 in box 12 wherein the coated electrode has a first surface 15 extending thereover. In this example, the coated electrode 14 has a predetermined density and porosity of active materials 4 for ion transport. As shown in FIG. 2b, the coated electrode 14 includes active materials 16 disposed therein spaced apart by voids 18. The active materials 16 and voids 18 in the coated electrode 14 define the density and thus the porosity of the coated electrode 14. That is, a higher active material content within the coated electrode 14 provides a higher density of active materials and a lower porosity of the coated electrode 14. Whereas, a lower active material content provides a lower density of active materials and a higher porosity of the coated electrode 14.

As shown in FIG. 1, the method 10 further comprises a step of drying the coated electrode 14 in box 20. The step of drying 20 occurs at a temperature of between about 70 degree Celsius (C) and about 150 C for between about 0 minutes and about 60 minutes, defining a dried electrode. More preferably, the step of drying 20 occurs at a temperature of between about 75 C and about 105 C for between about 0 minutes and about 60 minutes. The step of drying 20 may involve any suitable manner by which to dry the coated electrode such as by heating with a heater known in the art. In this embodiment, dryness may be quantified in percent solids by weight. For example, dryness may be measured by comparing the weight of the coated electrode 14 prior to the step of drying 20 and the weight of the dried electrode after the step of drying 20. As an example, the coated electrode 14 may have a dryness of between about 40% and about 90% solids before the step of drying 20. After the step of drying 20, the dried electrode may have a weight of between about 90% and about 100% solids.

Referring to FIGS. 1, 3a, and 3b, the method 10 further comprises a step of selectively modifying the dried electrode in box 22 by patterning the first surface 15 to define a patterned electrode 24. As shown in FIGS. 3a and 3b, the patterned electrode 24 preferably has a plurality of first portions 26 and a plurality of second portions 28 after selectively modifying the dried electrode. In this example, the step of selectively modifying 22 comprises selectively removing a volume of the active materials 16 from the dried electrode by subtractive patterning the first surface 15. As shown in FIGS. 3a and 3b, subtractive patterning provides a pattern of active materials 16 defined by the volume of removed active materials from the first surface 15 of the dried electrode. As a result, subtractive patterning induces in-plane spatial variations in the density (or porosity) of the calendered electrode during a step of compressing (discussed below). In one example, subtractive patterning may include one of laser patterning and dot patterning but may include any other suitable manner by which to selectively remove a volume of the active material from the dried electrode without departing from the spirit or scope of the present disclosure.

Figure 4B:
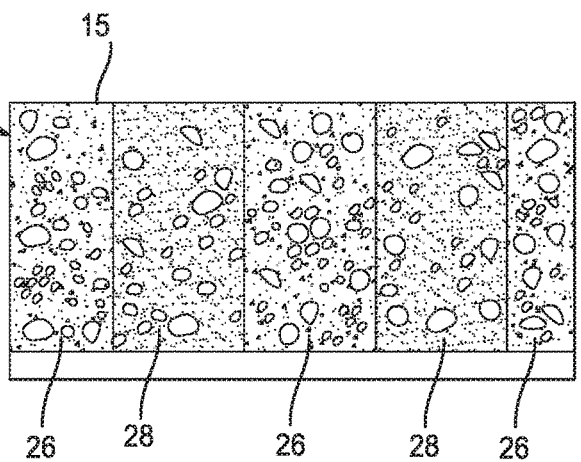

As shown in FIG. 1, the method 10 further comprises, after the step selectively modifying 22, a step of compressing the patterned electrode 24 in box 32 by calendering the first surface 15 to provide the first portion 26 having a first density (or porosity) of active materials 16 and the second portion 28 having a second density (or porosity) of active materials 16 (FIG. 4b). In this example, after the step of compressing 32, the second density is greater than the first density to define the calendered electrode 42 having a spatial variation of active material density or porosity.

Referring to FIG. 4b, the first portion 26 has a first density of between about 40% and about 60% active material. Moreover, the second portion 28 has a second density of between about 60% and about 90% active material, and preferably between about 65% and about 75% active materials.

In one example, the step of calendering may include a calendering apparatus 34 (FIG. 5) having a pair of rollers 36, 38 spatially arranged to define a gap 40 through which the patterned electrode 24 is disposed. In this example, the rollers are designed to operatively receive and compress the patterned electrode 24 to define the calendered electrode 42. It is to be understood that gap 40 is not the same as a thickness of the patterned electrode 24. That is, the gap is typically smaller than the thickness of the patterned electrode as known in the art. It is also to be understood that any other suitable mechanism may be used to compress the patterned electrode without departing from the spirit or scope of the present disclosure.

In the example discussed above, the step of compressing 32 comprises calendering the first surface 15 at a predetermined line speed veal, a predetermined force FN, a predetermined gap 40, and a predetermined temperature, T. Preferably, the predetermined line speed is between about 0.1 and about 150 meters per minute and more preferably about 1.0 and about 60 meters per minute. Moreover, the predetermined force is between about 1 and about 10 megapascals. Also, the predetermined gap is between about 0.015 millimeter (mm) and 4 mm, and more preferably between about 0.100 mm and about 0.250 mm. Furthermore, the predetermined temperature is between about ambient temperature and about 80 C, and preferably between about ambient temperature and about 50 C. Preferably but not necessarily, the first portion 26 includes a plurality of first portions 26 and the second portion 28 includes a plurality of second portions 28. Furthermore, the density of the first portion (or second portion) of the patterned electrode is represented by $\rho_{c,o}$ and the density of the second portion of the calendered electrode is represented by $\rho_c$.

Figure 6:
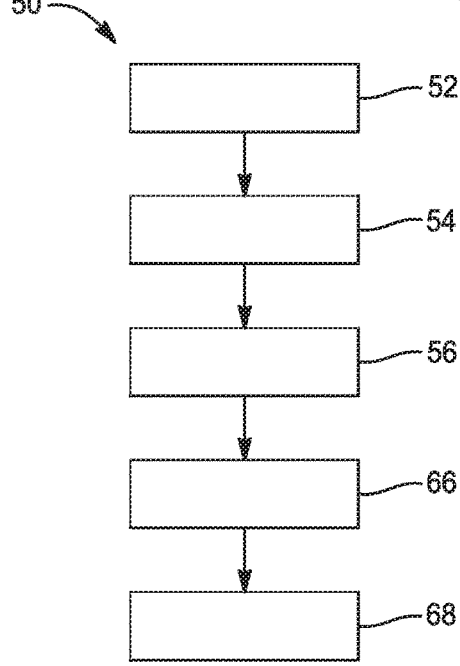
FIG. 6 is a flowchart of a method of making a calendered electrode for a battery cell in accordance with another embodiment of the present disclosure.

According to aspects of the present disclosure, another method 50 of making a calendered electrode for a battery cell is provided in FIG. 6. As shown, the method 50 comprises introducing 52 a coated electrode (see FIGS. 2a and 2b) having a first surface extending thereover. In this example, the coated electrode has a predetermined porosity (or density) of active materials for ion transport.

Figure 8A:
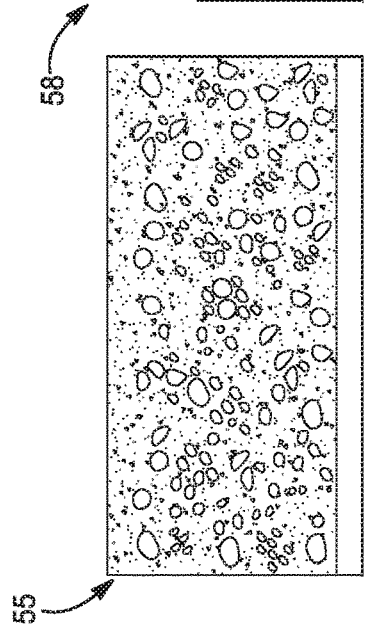
FIG. 8a is a cross-sectional view of a partially-dried electrode in accordance with one example of the present disclosure.

As illustrated in FIG. 6, the method 50 further comprises a step of partially drying the coated electrode in box 54 to define a partially-dried electrode 55 (FIG. 8a). In this example, the step of partially drying 54 comprises heating the coated electrode to between about 70 C and 150 C for between about 0 minutes and about 30 minutes. More preferably, the step of partially drying 54 may comprise heating the coated electrode to between about 75 C and about 105 C for between about 0 minutes and 30 minutes. The step of partially drying 54 may involve any suitable matter by which to partially dry the coated electrode such as by heating with a heater known in the art. As discussed in the previous aspect, dryness may be quantified in percent solids by weight. For example, dryness may be measured by comparing the weight of the coated electrode prior to the step of partially drying 54 and the weight of the partially-dried electrode 55 after the step of partially drying 54. As an example, the coated electrode may have a dryness of between about 30% and about 45% solids before the step of partially drying 54. After the step of partially-drying, the partially-dried electrode 55 may have a weight of between about 50% and about 75% solids.

Figure 8B:
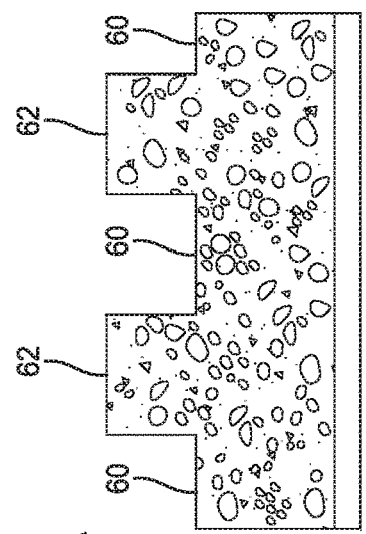

Referring to FIG. 6, the method 50 further comprises a step of selectively modifying the partially-dried electrode 55 in box 56 by patterning the first surface to define a patterned electrode 58. As shown in FIG. 8b, the patterned electrode 58 preferably has a plurality of first portions 60 and a plurality of second portions 62 after the step of selectively modifying 56 the partially-dried electrode 55.

Figure 7A:
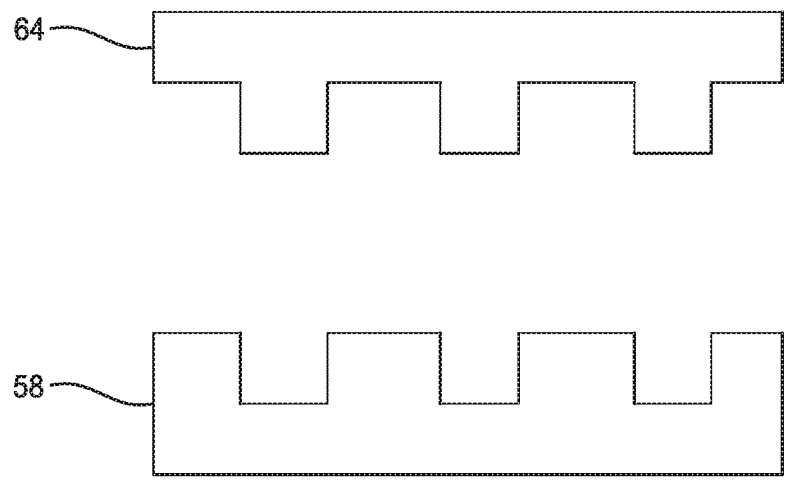
FIG. 7a is a schematic view of a stamping tool for the method in FIG. 6.

In this example, the step of selectively modifying 56 may comprise stamping (FIGS. 7a and 7b) the first surface of the partially-dried electrode 55 to arrange a predetermined topography of the electrode, allowing for in-plane spatial variations in the density of the calendered electrode during a step of compressing (discussed below). When partially-dried, the electrode is at a physical state in which the active materials may flow, allowing for structural rearrangement of the electrode without affecting the porosity (or density) thereof. Thus, after partially-drying the coated electrode, a stamping tool 64 (FIG. 7a) may be used for stamping the first surface of the partially-dried electrode 55 to form a predetermined pattern thereon, defining the patterned electrode 58. As a result, stamping induces in-plane spatial variations in the density (or porosity) of the calendered electrode during compressing (discussed below). It is to be understood that arranging a predetermined topography of the coated electrode may include any other suitable manner by which to structurally modify or rearrange the active materials within the partially-dried electrode without departing from the spirit or scope of the present disclosure.

Moreover, the method 50 comprises a step of finalize drying the patterned electrode 58 in box 66 after the step of selectively modifying 56 to define a finalize-dried electrode. The step of finalize drying 66 may involve any suitable manner by which to finalize dry the patterned electrode 58 such as by heating with a heater known in the art. After the step of finalize drying 66, the finalize-dried electrode may have a weight of between about 75% and about 100% solids. In this example, the step of finalize drying 66 comprises heating the patterned electrode 58 to between about 70 C and 150 C for between about 20 minutes and about 40 minutes, and more preferably between about 75 C and about 105 C for between about 20 and 40 minutes.

Figure 8C:
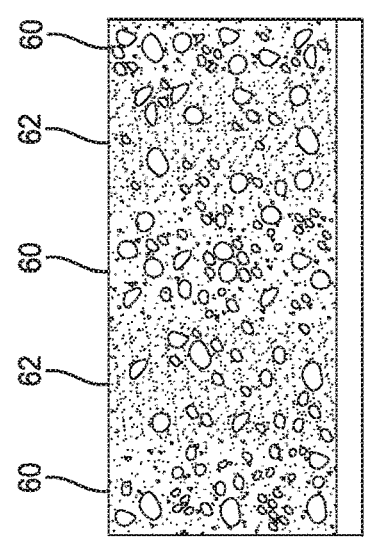

As shown in FIG. 1, the method 50 further comprises, after the step of finalize drying, a step of compressing the finalize-dried electrode in box 68 by calendering the first surface to provide the first portion 60 having a first density (or porosity) of active materials and the second portion 62 having a second density (or porosity) of active materials (FIG. 8c). In this example, after the step of compressing 68, the second porosity is less than the first porosity to define the calendered electrode having a spatial variation of porosity. In one example, the first porosity is the predetermined porosity and is between about 40% and about 60% porous. Moreover, the second porosity is between about 10% and 40% porous.

Thus, the second density is greater than the first density to define the calendered electrode having a spatial variation of active material density (or porosity). Referring to FIG. 8c, the first portion 60 preferably has a first density of between about 40% and about 60% active material. In this example, the first portion 60 may have a porosity of between about 60% and 40% porosity. Moreover, the second portion 62 preferably has a second density of between about 60% and about 90% active material. In this example, the second portion 62 may have a porosity of between about 40% and about 10% porosity.

Figure 5:
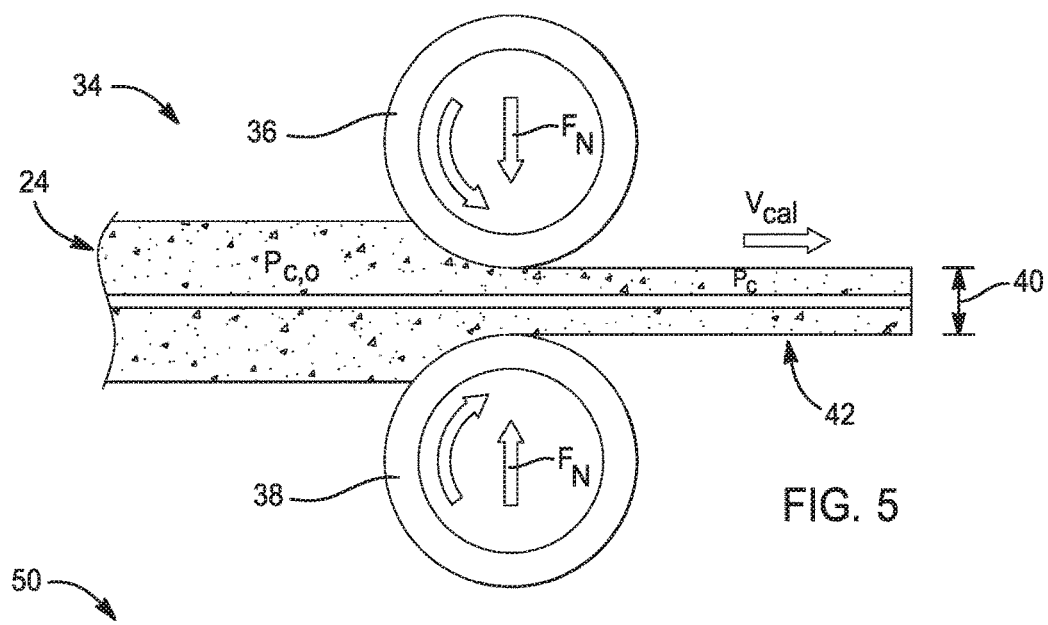
FIG. 5 is a diagram of a calendering apparatus in accordance with the method in FIG. 1.

In one example, the step of calendering may include a calendering apparatus that is the same or similar to the calendering apparatus shown in FIG. 5. As shown, the calendering apparatus has a pair of rollers spatially arranged to define a gap through which the patterned electrode is disposed. As shown in FIG. 5, the rollers are designed to operatively receive and compress the electrode, defining the calendered electrode. However, it is to be understood that any other suitable mechanism may be used to compress the patterned electrode without departing from the spirit or scope of the present disclosure.

In the example discussed above, the step of compressing 68 comprises calendering the first surface at a predetermined line speed, a predetermined force, a predetermined gap, and a predetermined temperature. Preferably, the predetermined line speed is between about 0.1 and about 150 meters per minute and more preferably about 1.0 and about 60 meters per minute. Moreover, the predetermined force is between about 1 and about 10 megapascals. Also, the predetermined gap is between about 0.015 millimeter (mm) and 4 mm, and more preferably between about 0.100 mm and about 0.250 mm. Furthermore, the predetermined temperature is between about ambient temperature and about 80 degrees Celsius, and preferably between about ambient temperature and about 50 C. Preferably but not necessarily, the first portion 60 includes a plurality of first portions and the second portion 62 includes a plurality of second portions.

Figure 7B:
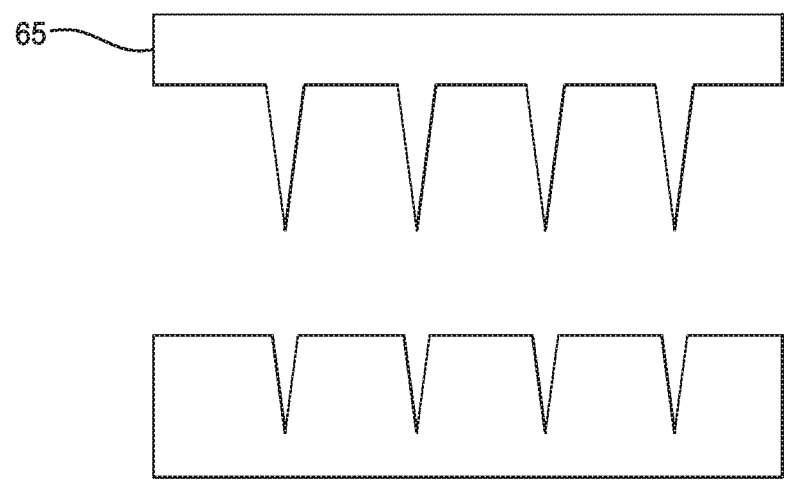
FIG. 7b is a schematic view of another stamping tool for the method in FIG. 6.
Figure 9A:
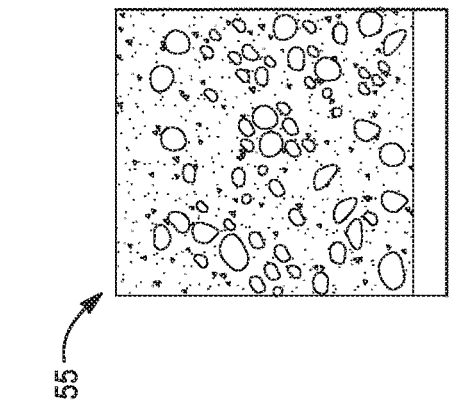
FIG. 9a is a cross-sectional view of a partially-dried electrode in accordance with another example of the present disclosure.
Figure 9B:
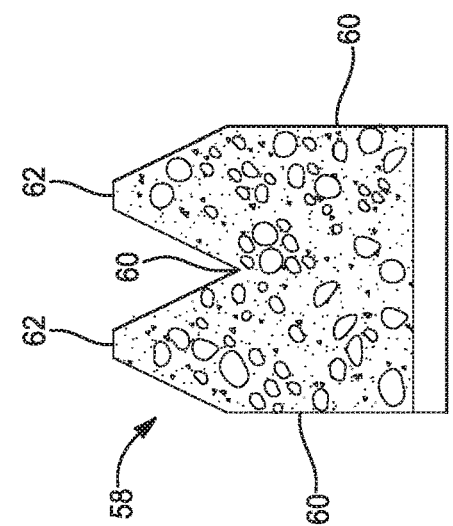
FIG. 9b is a cross-sectional view of a patterned electrode by the stamping tool in FIG. 7b.
Figure 9C:
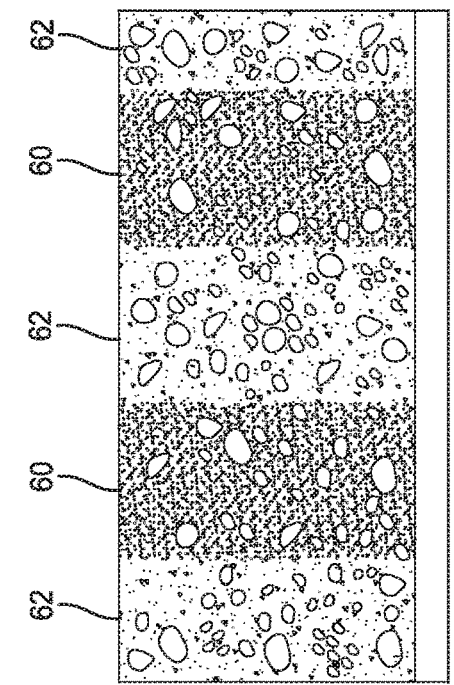
FIG. 9c is a cross-sectional view of a calendered electrode from the patterned electrode in FIG. 9b.

Referring to FIG. 7b, a stamping tool 65 is pin-shaped which is designed to form a trough pattern on the first surface of the electrode. In this example, at least one trough on the first surface is formed during the step of selectively modifying 56 as shown in FIG. 9b. Stamping induces in-plane spatial variations in the density or porosity of the calendered electrode during the step of compressing (discussed above). Moreover, during the step of compressing 68, the trough pattern formed on the first surface provides a gradient variation in porosity and density as shown in FIG. 9b. That is, after the step of compressing 68, a first gradient portion 60 having a first gradient porosity and a first gradient density, and a second gradient portion 62 having a second gradient porosity and a second gradient density are provided. In this example, the first gradient porosity may be between about 50% porous and about 40% porous, and the first gradient density may be between about 50% density and about 60% density. Moreover, the second gradient porosity may be between about 40% porosity and about 15% porosity, and the second gradient density may be between about 60% and about 85%.

In accordance with yet another aspect of the present disclosure, a current collector for a battery cell is provided. In this embodiment, the current collector comprises a calendered electrode 42 (FIGS. 4a and 4b) comprising a selectively modified first portion 26 having a first density of active materials and a selectively modified second portion 28 having a second density of active materials. Preferably, the second density is greater than the first density for spatial variation of active material density to enhance ion transport within the calendered electrode. In a preferred embodiment, the first portion 26 includes a plurality of first portions and the second portion 28 includes a plurality of second portions for enhanced ion transport within the calendered electrode.

Referring to FIG. 4b, the first portion 26 preferably has a first density of between about 40% and about 60% active material. Moreover, the second portion 28 preferably has a second density of between about 60% and about 90% active material. Moreover, the first porosity is preferably between about 40% and about 60% porous. Furthermore, the second porosity is preferably between about 10% and about 40% porous.

The description of the present disclosure is merely exemplary in nature and variations that do not depart from the scope or spirit of the present disclosure are intended to be within the scope of the present disclosure. Such variations are not to be regarded as a departure from the spirit and scope of the present disclosure.

What is claimed is:

1. A method of making a calendered electrode for a battery cell, the method comprising:
   introducing a coated electrode having a first surface extending thereover, the coated electrode having a predetermined density of active materials for ion transport;
   drying the coated electrode to one of about 70 C for about 40 minutes and about 150 C for about 20 minutes;
   after drying, selectively modifying the coated electrode by patterning the first surface to define a patterned electrode having a first portion and a second portion; and
   after the step of selectively modifying, compressing the patterned electrode by calendering the first surface to provide the first portion having a first density of active materials and the second portion having a second density of active materials, the second density being greater than the first density to define the calendered electrode having a spatial variation of active material density.

2. The method of claim 1 wherein the step of selectively modifying comprises selectively removing a volume of the active materials from the patterned electrode by subtractive patterning the first surface to induce in-plane spatial variations in the density of the calendered electrode during the step of compressing.

3. The method of claim 2 wherein subtractive patterning includes one of laser patterning and dot patterning.

4. The method of claim 1 further comprising:
   before the step of selectively modifying, partially drying the coated electrode; and
   after the step of selectively modifying, finalize drying the patterned electrode.

5. The method of claim 4 wherein the step of partially drying comprises heating the coated electrode to between about 70 C and 150 C for between about 0 and about 30 minutes and wherein the step of finalize drying comprises heating the patterned electrode to between about 70 C and 150 C for between about 20 minutes and about 40 minutes.

6. The method of claim 1 wherein the first density is the predetermined density.

7. The method of claim 1 wherein the first density is the predetermined density and is between about 40% and about 60% active material, and wherein the second density is between about 60% and about 90% active material.

8. The method of claim 1 wherein the step of compressing comprises calendering the first surface at a predetermined line speed, a predetermined force, a predetermined gap, and a predetermined temperature.

9. The method of claim 8 wherein the predetermined line speed is between about 0.1 and about 150 meters per minute, the predetermined force is between about 1 and about 10 megapascals, the predetermined gap is between about 0.015 millimeter (mm) and 4 mm, and the predetermined temperature is between about ambient temperature and about 80 degrees Celsius.

10. The method of claim 4 wherein the step of selectively modifying the coated electrode comprises stamping the first surface to arrange the topography of the coated electrode allowing for in-plane spatial variations in the density of the calendered electrode during the step of compressing.

11. The method of claim 1 wherein the first portion includes a plurality of first portions and wherein the second portion includes a plurality of second portions.

* * * * *